United States Patent

Wiggins et al.

(10) Patent No.: US 9,248,401 B2
(45) Date of Patent: Feb. 2, 2016

(54) SEPARATOR

(71) Applicants: E. Todd Wiggins, Port Aransas, TX (US); D. Jeffrey Hill, Oklahoma City, OK (US); J. Scott Hill, Edmond, OK (US)

(72) Inventors: E. Todd Wiggins, Port Aransas, TX (US); D. Jeffrey Hill, Oklahoma City, OK (US); J. Scott Hill, Edmond, OK (US)

( * ) Notice: Subject to any disclaimer, the term of this patent is extended or adjusted under 35 U.S.C. 154(b) by 2 days.

(21) Appl. No.: 14/444,623

(22) Filed: Jul. 28, 2014

(65) Prior Publication Data

US 2015/0041998 A1 Feb. 12, 2015

Related U.S. Application Data

(60) Provisional application No. 61/864,146, filed on Aug. 9, 2013.

(51) Int. Cl.
*B01D 53/26* (2006.01)

(52) U.S. Cl.
CPC .................................. *B01D 53/263* (2013.01)

(58) Field of Classification Search
CPC ................................................... B01D 53/263
USPC ........................................... 261/114.1, 114.5
See application file for complete search history.

(56) References Cited

U.S. PATENT DOCUMENTS

| 2,468,958 | A | * | 5/1949 | Candler | C10G 33/06 55/453 |
| 2,610,697 | A | * | 9/1952 | Lovelady | B01D 45/02 210/512.1 |
| 3,480,416 | A | * | 11/1969 | Stoops et al. | C07C 9/14 422/201 |
| 3,900,300 | A | | 8/1975 | Lehman | |
| 4,375,977 | A | * | 3/1983 | Honerkamp | B01D 53/263 261/114.2 |
| 4,591,367 | A | * | 5/1986 | Pek | B01D 45/12 55/344 |

FOREIGN PATENT DOCUMENTS

EP        0 629 422 A2 * 12/1994

* cited by examiner

*Primary Examiner* — Charles Bushey
(74) *Attorney, Agent, or Firm* — Dunlap Codding, P.C.

(57) ABSTRACT

A separator including a vessel, a tray assembly positioned within the vessel, and a wall structure arranged to accumulate a first liquid and a second liquid. A first automatic drain valve is operable to automatically allow liquid accumulated above a first liquid outlet to pass from the vessel in such a way as to maintain a volume of the first liquid above the first automatic drain valve to create a liquid seal over the first automatic drain valve, and a second automatic drain valve is operable to automatically allow liquid accumulated above the level of an open upper end of the wall structure to pass from the vessel in such a way as to maintain a volume of the second liquid above the second automatic drain valve to create a liquid seal over the second automatic drain valve.

12 Claims, 4 Drawing Sheets

SEPARATOR

CROSS REFERENCE TO RELATED APPLICATION

This application claims priority to U.S. Provisional Application Ser. No. 61/864,146, filed Aug. 9, 2013, the entire content of which is hereby expressly incorporated herein by reference.

BACKGROUND

Natural gas extracted from the ground typically includes a number of impurities and contaminants that are carried with the gas, such as water, oil, liquid hydrocarbons, solids, drilling mud, sulfur compounds, and others. Natural gas is typically decontaminated, dehydrated, and otherwise processed prior to being sold by consumers. An important part of the processing of natural gas is the removal of water from the natural gas because water can cause gas line clogging and bursting when the water is trapped in the gas line and freezes due to cold weather, for example.

A number of systems exist for dehydrating natural gas to remove water and other liquids from the natural gas. Most of these dehydration systems involve passing natural gas through, or contacting natural gas with, one of a number of known desiccant fluids, such as tri-ethylene glycol. Desiccant fluids essentially dissolve or otherwise absorb water, liquid hydrocarbons, and other liquids and contaminants from natural gas. The dehydrated natural gas is discharged from the dehydration system for use or as sales gas, and the "wet" desiccant fluids are typically recycled through the dehydration system to be regenerated (or returned to a "dry" state) and reused to dehydrate natural gas.

One of the steps of recycling wet desiccant fluids may include processing wet desiccant fluids with a three-phase separator, known as a flash separator, to separate gas and hydrocarbon liquids from the wet desiccant fluid. Several prior art three-phase glycol separators have been suggested. However, such separators rely on float level controllers and motor valves to control the levels of glycol inside the separator. Such float level-controllers and motor valves are complicated to use, require constant adjustments in the field, and are inherently unreliable and known to cause frequent malfunctions and delays. Further, the efficiency of separation of the float level-controlled prior art devices is largely dependent on operator skill and training, which coupled with the frequent need of adjusting the float level controllers and motor valves, results in inconsistent separation, shortened life of the desiccant fluids, and gas dehydration process inefficiencies.

BRIEF DESCRIPTION OF THE DRAWINGS

Like reference numerals in the figures represent and refer to the same or similar element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF EXEMPLARY EMBODIMENTS

Figure 1:
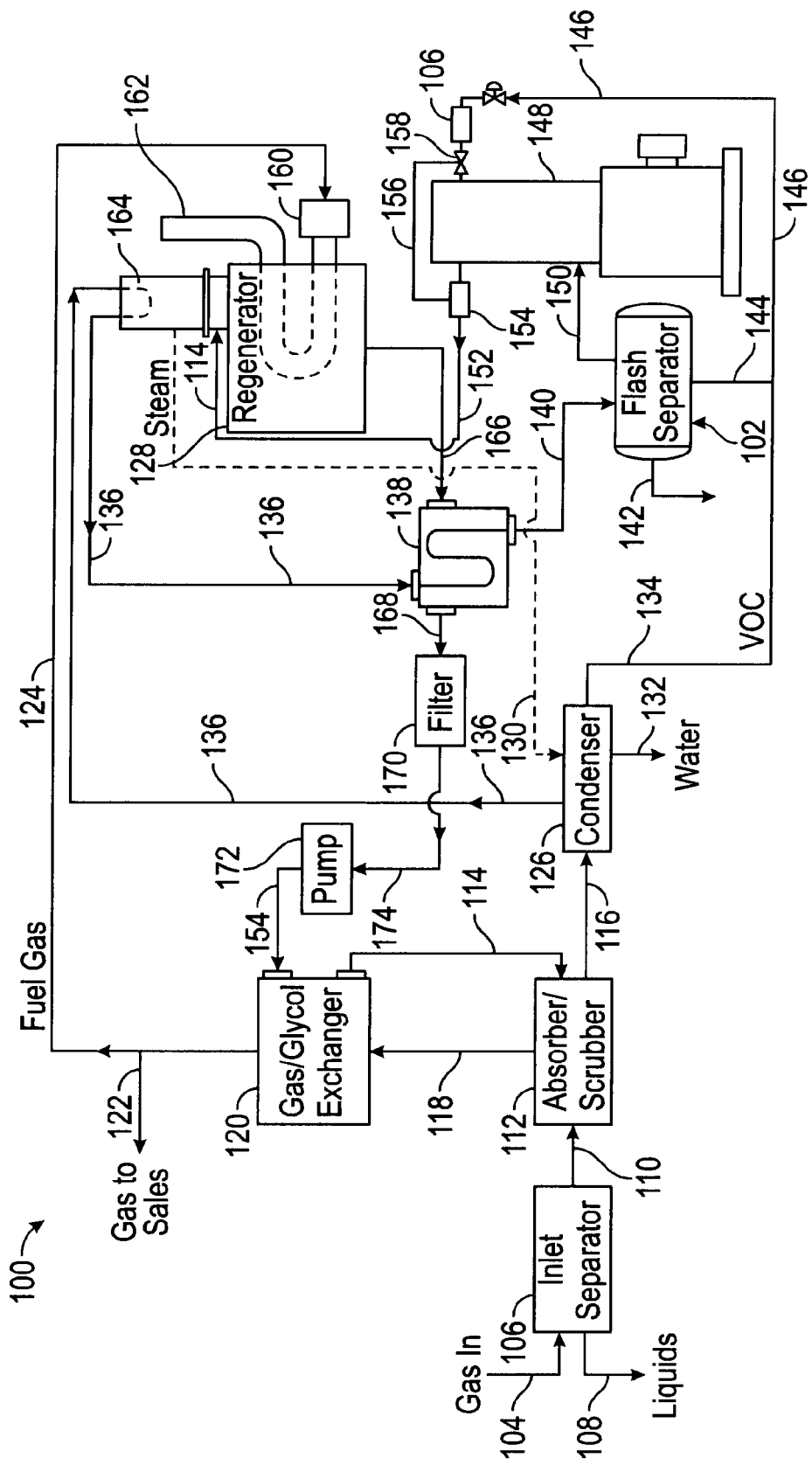
FIG. 1 is a schematic view of an exemplary natural gas dehydration system with which a separator constructed in accordance with the inventive concepts disclosed herein may be used.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. The inventive concepts disclosed herein are capable of other embodiments or of being practiced or carried out in various ways. Also, it is to be understood that the phraseology and terminology employed herein is for the purpose of description and should not be regarded as limiting.

In the following detailed description of embodiments of the instant disclosure, numerous specific details are set forth in order to provide a more thorough understanding of the inventive concepts disclosed herein. However, it will be apparent to one of ordinary skill in the art that the inventive concepts disclosed herein may be practiced without these specific details. In other instances, well-known features have not been described in detail to avoid unnecessarily complicating the instant disclosure.

As used herein the notation "a-n" appended to a reference numeral is intended as merely convenient shorthand to reference one, or more than one, and up to infinity, of the element or feature identified by the respective reference numeral (e.g., $100a\text{-}n$). Similarly, a letter following a reference numeral is intended to reference an embodiment of the feature or element that may be similar, but not necessarily identical, to a previously described element or feature bearing the same reference numeral (e.g., $100$, $100a$, $100b$, etc.). Such shorthand notations are used for purposes of clarity and convenience only, and should not be construed to limit the inventive concepts disclosed herein in any way, unless expressly stated to the contrary.

Further, unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concepts. This description should be read to include one or at least one and the singular also includes the plural unless it is obvious that it is meant otherwise.

As used herein the qualifiers "about," "approximately," and "substantially" are intended to include not only the exact amount, orientation, amount, value, or degree qualified, but are intended to include some small variations due to measurement error, manufacturing tolerances, stresses exerted on the respective component, part, or structure, wear and tear, internal pressures, corrosion, and combinations thereof, for example.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Referring now to the drawings, and more particularly to FIG. 1, an exemplary embodiment of a gas dehydration system 100 is schematically illustrated. The gas dehydration system 100 is an example of a system with which separators constructed in accordance with the inventive concepts disclosed herein may be used. For example, a separator 102 is illustrated as being employed as a part of the gas dehydration system 100. The gas dehydration system 100 is only one exemplary embodiment of such a system, and is in no way intended to be exhaustive of various configurations of systems with which separators according to the inventive concepts disclosed herein may be used.

Most elements of the gas dehydration system 100 are well known in the art, and will only be described in terms of function as they contribute to the gas dehydration system 100 as a whole to provide an overview of the gas dehydration system 100, so that the operation of the separator 102 according to the inventive concepts disclosed herein may be more fully understood. As will be appreciated by persons of ordinary skill in the art, an exemplary embodiment of a separator 102 according to the inventive concepts disclosed herein may be implemented with other types of systems in the petroleum production industry, and in other fields or industries where solids, liquids, and/or gases may need to be separated from one another, for example.

Natural gas enters the gas dehydration system 100 via a conduit 104, such as from a natural gas well, for example. The natural gas first enters an inlet separator 106, where impurities, such as entrained water droplets, some hydrocarbon droplets, sand, rust, and the like, may be permitted to fall out of the natural gas. These separated impurities may then be routed, via conduit 108, to a storage tank (not shown) or to any other disposal structure or facility, for example.

Natural gas is then routed from the inlet separator 106, via conduit 110, to an absorber 112. The absorber 112 primarily functions to remove water vapor from the natural gas. As a secondary consequence, volatile organic compounds, known in the art as VOC's, and/or aromatic hydrocarbons, known in the art as BTEX, may also be removed from the natural gas. The absorber 112 performs this function by bringing natural gas into contact with a desiccant fluid which absorbs the water vapor, VOC's, BTEX, and other impurities from the natural gas. For simplicity, these VOC's, BTEX, and other impurities may in places below be referred to as off-gases. Desiccant fluids typically used in the art include di-ethylene glycol, tri-ethylene glycol, mixtures of di-ethylene and tri-ethylene glycols, or di-glycol amine. The desiccant fluid may be any other suitable fluid as well, and for simplicity will hereafter be referred to as glycol.

The absorber 112 receives "dry" glycol via conduit 114, and passes the dry glycol downward in contact with upwardly-flowing natural gas, and discharges "wet" glycol via conduit 116. The natural gas is discharged from the absorber 112 in a "dry" state, substantially free of water and impurities, and is essentially ready to be used or sold to consumers. The natural gas is discharged from the absorber 112, via conduit 118, to a gas/glycol heat exchanger 120. The gas/glycol heat exchanger 120 permits the dry natural gas to pass in thermal communication with dry glycol so as to recapture thermal energy from the dry natural gas. Dry natural gas may be discharged from the gas/glycol heat exchanger 120 via conduit 122, to be sold or otherwise transferred for use, for example. A portion of the dry natural gas may also be diverted, via conduit 124, for use within the gas dehydration system 100, such as for heating incoming natural gas.

Returning now to the wet glycol discharged from absorber 112 via conduit 116, the wet glycol may be transferred to a condenser 126 that receives steam from a regenerator 128 via conduit 130. The function of the regenerator 128 will be described in more detail below. Within the condenser 126, wet glycol from conduit 116 is used to condense water vapor and off-gases out of the steam. The water may be separated and discharged, via conduit 132, to a storage tank (not shown), or to any other disposal structure or facility. The off-gases are discharged from the condenser 126, via conduit 134, for use within the gas dehydration system 100, such use to be described in more detail below. Glycol is then discharged from the condenser 126, via conduit 136, and routed to absorb thermal energy from a portion of the regenerator 128. The function of the regenerator 128 is well known in the art, and will not be described in great detail herein.

Glycol is then passed through a glycol/glycol heat exchanger 138 and discharged, via fluid supply conduit 140, to a separator, such as the separator 102. The separator 102 functions to remove at least a portion of any remaining liquid distillates and off-gases from the glycol. The separator 102 may further separate the liquid distillates and off-gases from one another. The liquid distillates may be discharged from the separator 102, via a conduit 142, to a storage tank (not shown) or to any other disposal structure or facility, such as a settling tank, for example.

The off-gases may be discharged from the separator 102, via a gas conduit 144, and may be joined with the off-gases in conduit 134 from the condenser 126. The combined off-gases may then be routed to a flare stack 148 via conduit 146, to be burned so as to generate heat and combustion byproducts, or may be mixed with the dry natural gas and sold to consumers as desired, and combinations thereof, for example.

Glycol may be routed from the separator 102, via a conduit 150, to the flare stack 148. The flare stack 148 may permit the glycol to absorb a portion of the thermal energy generated by the combustion of the off-gases from conduit 146. Additionally, the flare stack 148 may permit the off-gases from the conduit 146 to transfer a portion of this thermal energy from the glycol, before being burned, so as to ensure that the off-gases remain in a gaseous state to prevent explosions which may be caused by liquids condensing out of the off-gases, for example.

Heated glycol is then discharged from the flare stack 148, via a conduit 152, to the regenerator 128. The conduit 152 may be provided with a thermostat 154 in communication, via communication path 156, with a shut-off valve 158 in the conduit 152. The thermostat 154 may be implemented as any desired temperature-sensing device, and may monitor the temperature of the heated glycol exiting the flare stack 148, such that when the temperature of the glycol exceeds a predetermined maximum level, the thermostat 154 sends a signal to the shut-off valve 158, or otherwise causes or actuates, the shut-off valve 158 to at least partially close, thereby reducing or completely stopping the flow of fuel and shutting down the flare stack 148. The regenerator 128 may be of a well-known type having a burner 160, a vent 162, and a still column 164, for example. The burner 160 may receive dry gas from the conduit 124 to burn, generating thermal energy. The vent 162 may route this thermal energy through the regenerator 128 to heat the glycol to a temperature where any remaining water in the glycol is vaporized, but where the glycol remains in a liquid state. The water vapor boiled out of the glycol may be collected in the still column 164. As shown, and as described above, the conduit 136 may pass through a portion of the still column 164, where it can be heated by the steam, for example.

Although in some regenerators 128, the still column 164 may be vented to the atmosphere, the regenerator 128 may collect the water vapor or steam and, may route it to the condenser 126 via the conduit 130 as described above. Once the remaining water vapor is removed from the glycol, returning the glycol to a "dry" state, the dry glycol may be routed from the regenerator 128, via a conduit 166, to the glycol/glycol heat exchanger 138 where thermal energy can be transferred to the wet glycol from the conduit 136. Dry glycol may then be routed from the glycol/glycol heat exchanger 138, via a conduit 168, through a filter 170, to remove any remaining solid particles or other impurities. Next, a pump 172 may draw dry glycol from the filter 170, via a conduit 174, and may deliver dry glycol, via a conduit 176, to the gas/glycol heat exchanger 120. In the gas/glycol heat exchanger 120, dry glycol may absorb thermal energy from dry natural gas, before being delivered to the absorber 112, via the conduit 118, so the process can be cyclically repeated, for example.

Figure 2:
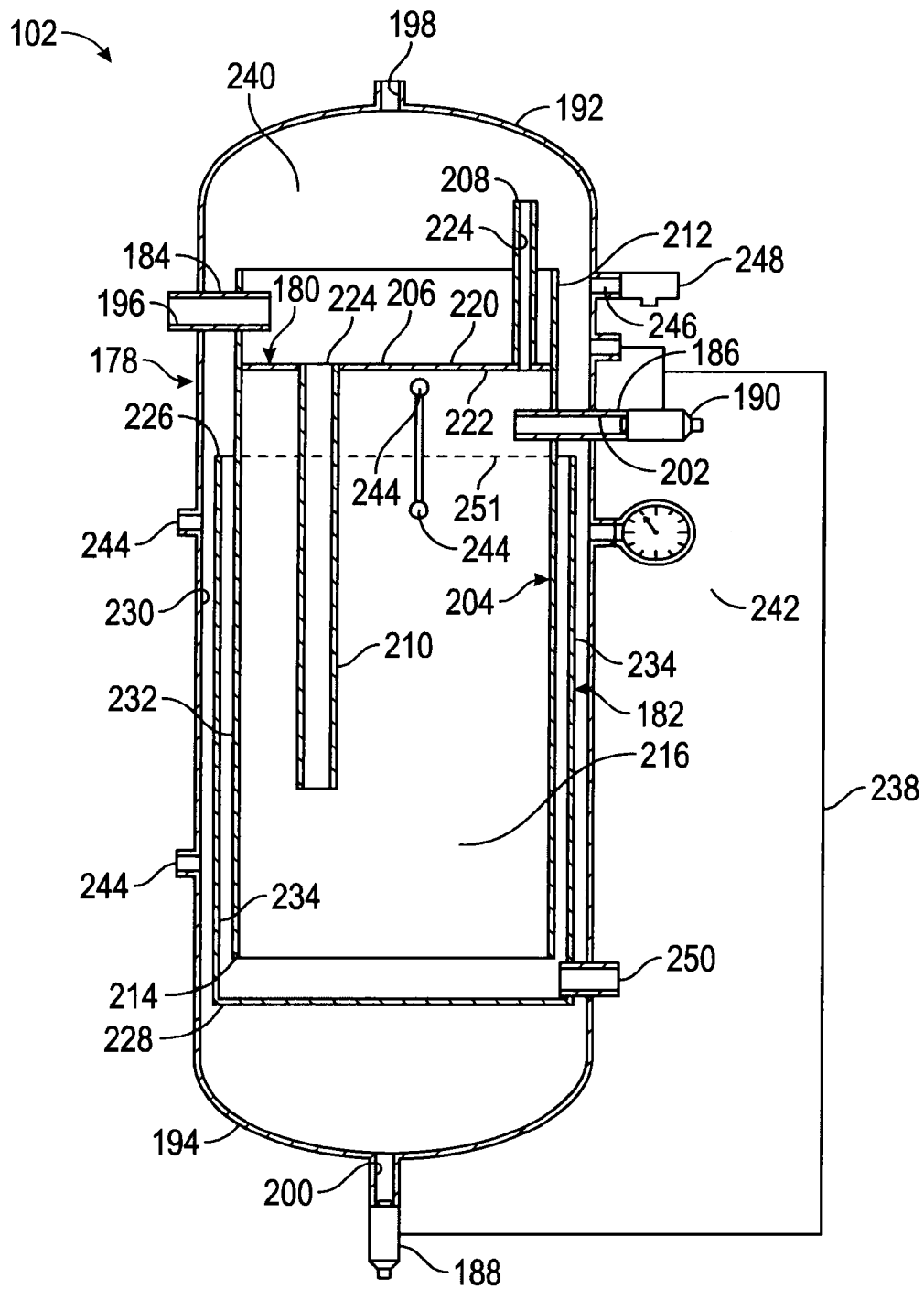
FIG. 2 is a diagrammatic, cross-sectional view of a vertical separator constructed in accordance with the inventive concepts disclosed herein.

Referring now to FIG. 2, a separator 102 constructed in accordance with inventive concepts disclosed herein is illustrated. The separator 102 includes a vessel 178, a tray assembly 180, an outer wall structure 182, a fluid inlet conduit 184, a liquid outlet conduit 186, and one or more automatic drain valves 188 and 190.

The vessel 178 has an upper end 192, a lower end 194, at least one fluid inlet 196, a gas outlet 198 positioned at the upper end 192, a first liquid outlet 200 for discharging a first liquid (e.g., glycol), and a second liquid outlet 202 for discharging a second liquid (e.g., oil or condensate). The vessel 178 may be implemented as a high-pressure vessel or tank made of any suitable material capable of handling the pressure likely to be encountered by the separator 102. For example, the vessel 178 may be constructed of steel, stainless steel, aluminum, or other metals, or non-metals, and combinations thereof. In an exemplary embodiment, the vessel 178 may have a 48" outer diameter and a 96" height, and may be rated for maximum allowable working pressure (MAWP) of about 1440 psig, and a working temperature range from about −12° Fahrenheit to about 200° Fahrenheit.

The fluid inlet conduit 184 may be in fluid communication with a fluid supply conduit 140 (FIG. 1), which fluid supply conduit 140 (FIG. 1) may deliver a mixture of fluids that may include gas and liquids. The liquids may include glycol, water, liquid hydrocarbons, and combinations thereof, such as wet glycol including oil condensate and gas from the gas dehydration system 100 (FIG. 1).

The gas outlet 198 functions to allow gas to be removed from the vessel 178 of the separator 102 and conveyed into a gas line. The gas outlet 198 may be in fluid communication with a gas conduit 144 (FIG. 1) configured to carry any gas separated in the separator 102 to any desired location, such as a sales gas line or a flare line, for example.

The tray assembly 180 is positioned within the vessel 178 and includes an inner wall structure 204, a deck 206, a gas return conduit 208, and a liquid return conduit 210. The tray assembly 180 may be constructed of any suitable material, such as steel, stainless steel, titanium, metals, alloys, non-metals, resilient plastics, fiberglass, resins, fibrous materials, polymers, and combinations thereof, for example, and may be formed using any conventional manufacturing techniques or methods. The inner wall structure 204 has an upper end 212 and a lower end 214 and defines a liquid receiving space 216. At least a portion of the inner wall structure 204 is spaced from the lower end 194 of the vessel 178.

The deck 206 extends from the inner wall structure 204 between the upper end 212 and the lower end 214 of the inner wall structure 204 and has an upper side 220, a lower side 222, and at least two apertures 224 extending through the deck 206. The deck 206 is shown as substantially circular in shape; however, the deck 206 may be implemented with any desired shape, such as oval, polygonal, hexagonal, square, triangular, rectangular, star-shaped, and combinations thereof, for example, and may have any desired orientation relative to the vessel 178.

The gas return conduit 208 extends upwardly from the deck 206 in alignment with one of the apertures 224 to provide a fluid passage from the lower side 222 of the deck 206 to a distance above the upper side 220 of the deck 206. The liquid return conduit 210 extends downwardly from the deck 206 in alignment with the other aperture 224 to provide a fluid passage from the upper side 220 of the deck 206 to a distance below the lower side 222 of the deck 206 to the liquid receiving space 216.

The outer wall structure 182 has an upper end 226 and a bottom end 228 and is positioned in the vessel 178 in such a way that the outer wall structure 182 is positioned between an inner side 230 of the vessel 178 and an outer side 232 of the inner wall structure 204 with the bottom end 228 of the outer wall structure 182 positioned lower than at least a portion of the lower end 214 of the inner wall structure 204 and the upper end 226 of the outer wall structure 182 positioned below a level at which the deck 206 is positioned so as to define a flow path 234 (e.g., an annular flow path) up between the inner wall structure 204 and the outer wall structure 182, over the upper end 226 of the outer wall structure 182, and down between the inner side 230 of the vessel 178 and the outer wall structure 182 to the first liquid outlet 200. The outer wall structure 182 is cylindrically shaped with an open upper end 226 and a closed bottom end 228 with the closed bottom end 228 being positioned between the lower end 214 of the inner wall structure 204 and the lower end 194 of the vessel 178.

The fluid inlet conduit 184 extends through the fluid inlet 196 of the vessel 178 to a position above the deck 206. The liquid outlet conduit 186 is in fluid communication with the liquid receiving space 216 of the inner wall structure 204 at a level between the lower side 222 of the deck 206 and the upper end 226 of the outer wall structure 182.

The automatic drain valve 188 is in fluid communication with the first liquid outlet 200. The automatic drain valve 188 is operable to automatically allow liquid accumulated above the first liquid outlet 200 to pass from the vessel 178 in such a way as to maintain a volume of liquid above the automatic drain valve 188 to create a liquid seal over the automatic drain valve 188. Similarly, the automatic drain valve 190 is in fluid communication with the second liquid outlet 202 and is operable to automatically allow liquid accumulated above the level of the upper end 226 of the outer wall structure 182 to pass from the vessel 178 in such a way as to maintain a volume of liquid above the automatic drain valve 190 to create a liquid seal over the automatic drain valve 190.

The vessel 178 is a vertical vessel and the inner wall structure 204 is a cylindrically shaped with an open upper end 212 and an open lower end 214.

The automatic drain valves 188 and 190 may be any suitable device commonly known as a liquid drainer, liquid drain trap, or auto drainer. Examples of suitable devices are guided float type liquid drainers commercially available from Watson McDaniel, Inc. of Norristown, Pa., model nos. WLD1800 and WLD1800R. Such drain valves may include a float operated valve that gives the drain valve a modulating flow characteristic. The amount of liquid flowing into the drain valve is sensed by the float which operates a main valve to discharge the liquid at the same rated as it is received.

The liquid outlet conduit 186 extends through the second liquid outlet 202 and into the liquid receiving space 216 of the inner wall structure 204.

A pressure-equalizing line 238 may be provided in fluid communication with the automatic drain valve 188 and a space 240 above the upper end 226 of the outer wall structure 182.

A pressure gauge 242 may be operably coupled with the interior of the vessel 178 such that the pressure gauge 242 may detect the pressure inside the vessel 178 and display the detected pressure in a form perceivable by a user. The optional pressure gauge 242 may display the pressure inside the vessel 178 locally, or may transmit the pressure to a remotely located control panel or system (not shown), and combinations thereof, for example.

One or more optional sight glasses 244, may be implemented with the vessel 178 to allow a user to visually inspect or observe a level of fluids inside the vessel 178, including, for example, the level of fluids and/or liquids in the liquid receiving space 216 and the flow path 234.

A pressure-relief opening 246 controlled by a pressure-relief valve 248 may be provided. The pressure-relief opening 246 may be operatively coupled to the pressure-relief valve 248 such that excess pressure in the vessel 178 may be released by the pressure-relief valve 248 when a predetermined threshold pressure is exceeded inside the vessel 178. To avoid releasing VOCs or other contaminants into the environment, such excess pressure may be released by allowing fluids or gases to escape the vessel 178 and enter a combustor/flare line (not shown), where the fluids may be safely disposed of by combusting or flaring, for example.

A drain 250 may be implemented and may extend into the vessel 178 and be fluidly coupled with the liquid receiving space 216 so that the fluid receiving space may be drained, for example, when the separator 102 is moved, or cleaned or maintained.

In operation, the vessel 178 of the separator 102 may receive a fluid via the fluid inlet conduit 184. The fluid may include a gas and a first liquid and a second liquid, such as natural gas, glycol, liquid hydrocarbons (or condensate), water, and other components, for example. The fluid is disposed onto the deck 206. Some of the gas present in the fluid may rise upwards above the deck 206 and may exit the vessel 178 via the gas outlet 198. A portion of the first liquid and the second liquid may exit the deck 206 and may flow into the liquid receiving space 216 via the liquid return conduit 210, for example. Any gases that may have entered the liquid receiving space 216 and thereafter separated from the liquid may rise upwards via the gas return conduit 208 or via the flow path 234 and may exit the vessel 178 via the gas outlet 198.

As the level of liquids inside the liquid receiving space 216 rises, an interface 251 may form in the liquid receiving space 216, and a layer of the first liquid (e.g., condensate or liquid hydrocarbons) may form on top of the second liquid (e.g., glycol) inside the liquid receiving space 216, for example. As will be appreciated by persons of ordinary skill in the art, such interface 251 may result from the relative difference in specific gravity between the first liquid and the second liquid, and a sufficient residence time of the mixture of the first and the second liquids may be allowed inside the liquid receiving space 216 to allow for the separation of the first liquid and the second liquid.

As the level of fluid inside the liquid receiving space 216 rises further, the second liquid level rises such that the second liquid flows under the lower end 214 of the inner wall structure 204 and rises up into the flow path 234 until the level of the second liquid reaches the upper end 226 of the outer wall structure 182. The second liquid then flows over the outer wall structure 182, through the flow path 234, and into the lower end 194 of the vessel 178. From there, the second liquid drains from the vessel 178 via the first liquid outlet 200 and the automatic drain valve 188. The automatic drain valve 188 may continuously or intermittently discharge liquid from the vessel 178, and in some exemplary embodiments, the rate at which the second liquid is discharged via the first liquid outlet 200 may be substantially equal to the rate at which fluids are admitted into the vessel 178 via the fluid inlet conduit 184. The automatic drain valve 188 may be configured to maintain an amount or volume of second liquid inside the first liquid outlet 200 such that a liquid seal is maintained inside the vessel 178. It is to be understood however, that in some exemplary embodiments of the inventive concepts disclosed herein a volume of the first liquid condensate may be included in the second liquid removed via the first liquid outlet 200.

The first liquid present in fluid in the liquid receiving space 216 may form a layer on top of the second liquid inside the liquid receiving space 216 (e.g., at the interface 251) and may be removed from the liquid receiving space 216 and from the vessel 178 via the second liquid outlet 202 and the automatic drain valve 190, and may be transported to a storage tank. The second liquid outlet 202 may be positioned at, or just above, the interface 251 height. The automatic drain valve 190 may operate to continuously or intermittently discharge the first liquid from the vessel 178 such that an amount or a volume of the first liquid is maintained inside the second liquid outlet 202 to create a liquid seal inside the vessel 178, which prevents or minimizes venting of gas through the second liquid outlet 202.

As will be readily appreciated by persons of ordinary skill in the art having the benefit of the instant disclosure, the separator 102 uses the automatic drain valves 188 and 190 to control the level of liquids inside the separator 102 without using unreliable float level controllers as discussed above.

Figure 3:
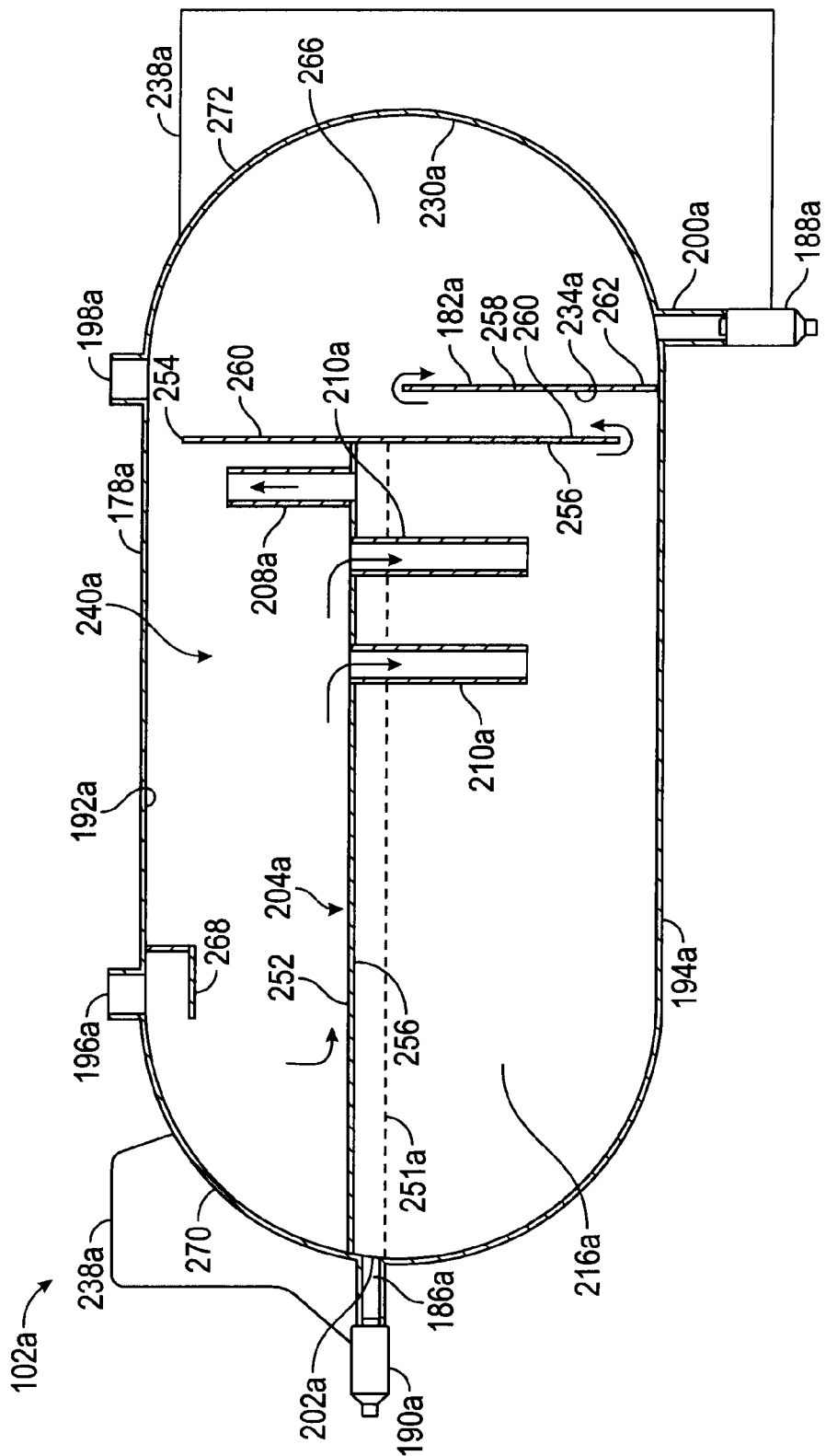
FIG. 3 is a diagrammatic, cross-sectional view of a horizontal separator constructed in accordance with the inventive concepts disclosed herein.

Referring now to FIG. 3, shown therein is an exemplary embodiment of a separator 102a according to the inventive concepts disclosed herein. The separator 102a may be implemented and may function similarly to the separator 102, except that the separator 102a includes a horizontal vessel 178a, an outer wall structure 182a, and an inner wall structure 204a.

The inner wall structure 204a includes a first plate 252 extending across the horizontal vessel 178a and having an upper end 254 spaced from an upper end 192a of the horizontal vessel 178a, and a lower end 256 spaced from a lower end 194a of the horizontal vessel 178a. The inner wall structure 204a also includes two liquid return conduits 210a and a gas return conduit 208a extending through the first plate 252 so that a liquid receiving space 216a below the first plate 252 and a space 240 above the first plate 252 are fluidly coupled with one another via the liquid return conduits 210a and the gas return conduit 208a.

The outer wall structure 182 includes a second plate 258 extending across the horizontal vessel 178a and positioned between an inner side 230a of the horizontal vessel 178a and an outer side 260 of the first plate 252 with a second end 262 of the second plate 258 extending to the lower end 194a of the horizontal vessel 178a and a top end 264 spaced a distance from the upper end 192a of the horizontal vessel 178a. The horizontal vessel 178a also includes a liquid outlet conduit 186a which extends through a liquid outlet 202a and into the liquid receiving space 216a of the inner wall structure 204a.

A liquid outlet 200a is fluidly coupled with a liquid receiving space 266 defined by the second plate 258 of the outer wall structure 182a and the inner side 230a of the horizontal vessel 178a.

A baffle 268 may be positioned between a fluid inlet 196a and the inner wall structure 204a so that fluids flowing into the horizontal vessel 178a encounter the baffle 268 so as to facilitate separation of gases therefrom and to direct liquids toward a first end 270 of the horizontal vessel 178a. As the fluids flow onto the inner wall structure 204a and towards a second end 272 of the horizontal vessel 178a, gases rise upward into the space 240a defined by the inner wall structure 204a and the upper end 192a of the horizontal vessel 178a. Gas is discharged from the horizontal vessel 178a via a gas outlet 198a which may be implemented and function similarly to the gas outlet 198.

Liquids, such as glycol and condensate, flow downwardly into the liquid receiving space 216 via the two liquid return conduits 210a. An interface 251a between a first liquid (e.g., glycol) and a second liquid (e.g., condensate) may form in the liquid receiving space 216a. The liquid outlet conduit 186a is positioned so that the liquid outlet conduit 186a is positioned at the height of the interface 251a. Condensate may leave the vessel via a liquid outlet 202a controlled by an automatic drain valve 190a. The liquid outlet 202a and the automatic drain valve 190 may be implemented and may function substantially similarly to the second liquid outlet 202 and the automatic drain valve 190, for example.

The first fluid may flow past a second end 262 of the inner wall structure 204a and upwardly via a flow path 234a defined by the inner wall structure 204a and the outer wall structure 182a (e.g., by the first plate 252 and the second plate 258). The liquid may flow over the second plate 258 and into the liquid receiving space 266 and may be drained from the horizontal vessel 178a via a liquid outlet 200a controlled by an auto drain valve 188a, as will be appreciated by persons of ordinary skill in the art having the benefit of the instant disclosure. Gas that has entered the liquid receiving space 216a may rise into the space 240a via the gas return conduit 208a.

Figure 4:
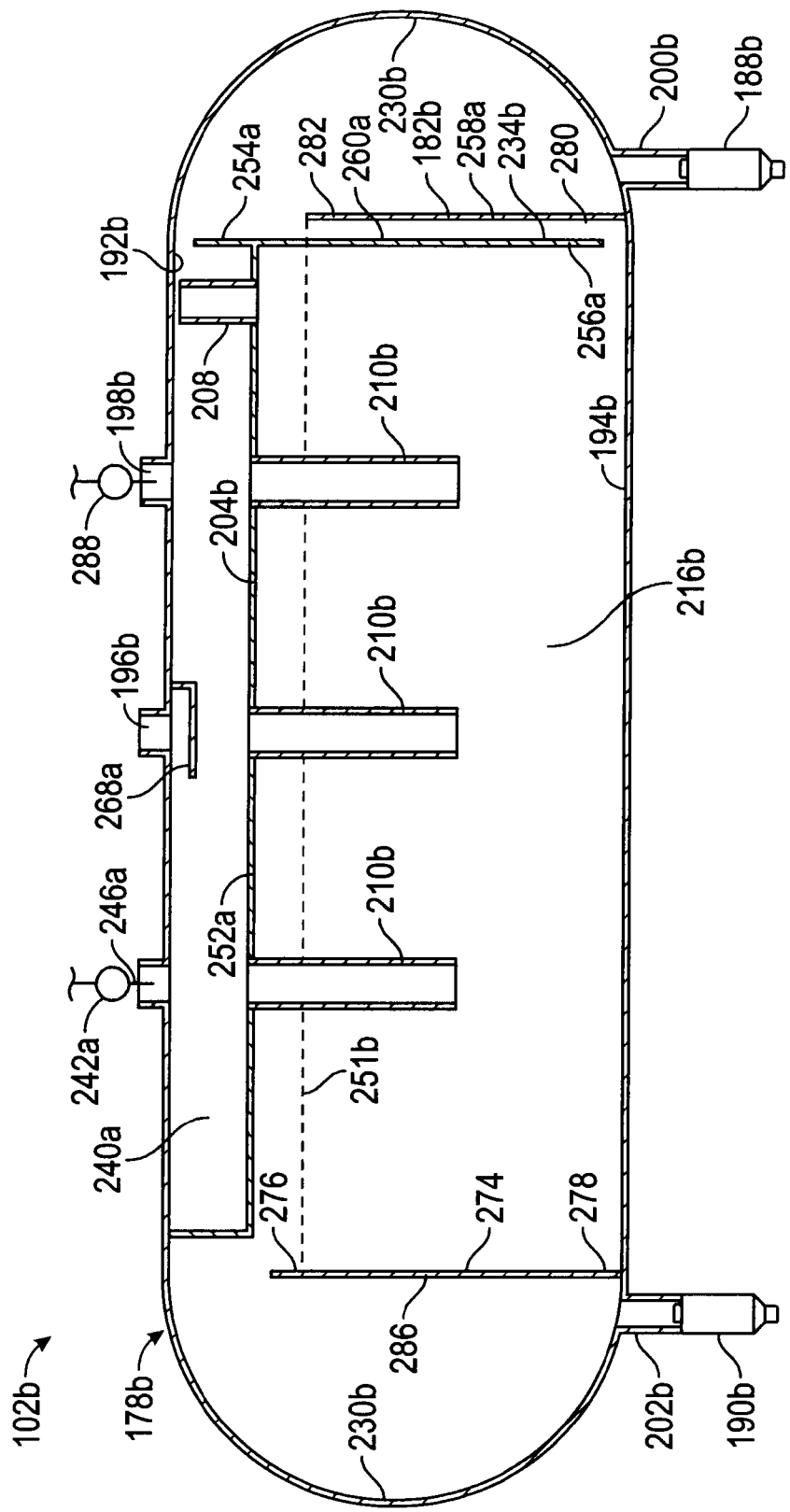
FIG. 4 is a diagrammatic, cross-sectional view of another embodiment of a horizontal separator constructed in accordance with the inventive concepts disclosed herein.

Referring now to FIG. 4, shown therein is a separator 102b according to the inventive concepts disclosed herein. The separator 102b may be implemented and may function similarly to the separator 102a and includes a horizontal vessel 178b, an inner wall structure 204b, and an outer wall structure 182b.

The inner wall structure 204b has a first plate 252a and a second plate 274. The first plate 252a extends across the horizontal vessel 178b and has an upper end 254a spaced from upper end 192b of the horizontal vessel 178b and a lower end 256a spaced from a lower end 194b of the horizontal vessel 178b. The second plate 274 extends across the horizontal vessel 178b and has an upper end 276 spaced from the upper end 192b of the horizontal vessel 178b and a lower end 278 extending to the lower end 194b of the horizontal vessel 178b. The inner wall structure also includes three liquid return conduits 210b and a gas return conduit 208b The outer wall structure 182b includes a second plate 258a extending across the horizontal vessel 178b and positioned between an inner side 230b of the horizontal vessel 178b and an outer side 260a of the first plate 252a, with a bottom end 280 of the second plate 258a extending to the lower end 194b of the horizontal vessel 178b, and a top end 282 spaced a distance from the upper end 192b of the horizontal vessel 178b.

A first liquid outlet 200b is formed in the lower end 194b of the horizontal vessel 178b between the inner side 230a of the horizontal vessel 178b and an outer side of the second plate 258a of the outer wall structure 182b, and is controlled by an automatic drain valve 188b. A second liquid outlet 202b is formed in the lower end 194b of the horizontal vessel 178b between the inner side 230b of the horizontal vessel 178b and an outer side 286 of the second plate 274 of the outer wall structure 182a. An optional pressure-equalizing line (not shown) may be operably coupled and/or interposed between the second automatic drain valve 190b and a space 240a above the inner wall structure 204b and down into a liquid receiving space 216b.

A pressure-relief valve 248a may be implemented similarly to the pressure-relief valve 248 and may be fluidly coupled with the horizontal vessel 178b via pressure-relief opening 246a.

The operation of the separator 102b may be substantially similar to the operation of the separators 102 and 102a. Fluids enter the separator through the fluid inlet 196b and may encounter a baffle 268a. The fluids may then flow over the inner wall structure 204b and down into a liquid receiving space 216b via the liquid return conduits 210b. Gas may rise and exit the horizontal vessel 178b via a gas outlet 198b, which may be controlled by an optional backpressure valve 288. As the liquids separate into the liquid receiving space 216b to form an interface 251b, the first liquid (e.g., glycol) may flow under the lower end 256a of the first plate 252a, upwardly through a flow path 234b between the first plate 252a and the second plate 258a, and may be drained from the horizontal vessel 178b via a liquid outlet 200b controlled by an automatic drain valve 188b.

The second liquid (e.g., condensate) may flow over the upper end 276 of the second plate 274 and may be drained from the horizontal vessel 178b via a second liquid outlet 202b controlled by an automatic drain valve 190b.

From the above description, it is clear that the inventive concepts disclosed herein is well adapted to carry out the objects and to attain the advantages mentioned herein as well as those inherent in the inventive concepts disclosed herein. While presently preferred embodiments of the inventive concepts disclosed herein have been described for purposes of this disclosure, it will be understood that numerous changes may be made which will readily suggest themselves to those skilled in the art and which are accomplished within the scope and coverage of the inventive concepts disclosed and claimed herein.

What is claimed is:

1. A separator, comprising:
   a vessel having an upper end, a lower end, at least one fluid inlet, a gas outlet positioned at the upper end, a first liquid outlet for discharging a first liquid, and a second liquid outlet for discharging a second liquid;
   a tray assembly positioned within the vessel, the tray assembly comprising:
      a first wall structure having an upper end and a lower end, the first wall structure defining a liquid receiving space and at least a portion of the first wall structure spaced from the lower end of the vessel; and
      a deck extending from the first wall structure between the upper end and the lower end of the first wall structure, the deck having an upper side, a lower side, at least two apertures extending through the deck;
      a gas return conduit extending upwardly from the deck in alignment with one of the apertures to provide a fluid passage from the lower side of the deck to a distance above the upper side of the deck; and
      a liquid return conduit extending downwardly from the deck in alignment with the other aperture to provide a fluid passage from the upper side of the deck to a distance below the lower side of the deck;

a second wall structure having an upper end and a bottom end, the second wall structure positioned in the vessel in such a way that the second wall structure is positioned between an inner side of the vessel and an outer side of the first wall structure with the bottom end of the second wall structure positioned lower than at least a portion of the lower end of the first wall structure and the upper end of the second wall structure positioned below a level at which the deck is positioned so as to define a fluid flow path up between the first wall structure and the second wall structure, over the upper end of the second wall structure, and down between the inner side of the vessel and the second wall structure to the first liquid outlet;

a fluid inlet conduit extending through the fluid inlet of the vessel to a position above the deck;

a liquid outlet conduit in fluid communication with the liquid receiving space of the first wall structure at a level between the lower side of the deck and the upper end of the second wall structure;

a first automatic drain valve in fluid communication with the first liquid outlet, the automatic drain valve being operable to automatically allow liquid accumulated above the first liquid outlet to pass from the vessel in such a way as to maintain a volume of the first liquid above the first automatic drain valve to create a liquid seal over the first automatic drain valve; and a second automatic drain valve in fluid communication with the liquid outlet conduit, the automatic drain valve being operable to automatically allow liquid accumulated above the level of the upper end of the second wall structure to pass from the vessel in such a way as to maintain a volume of the second liquid above the second automatic drain valve to create a liquid seal over the second automatic drain valve.

2. The separator of claim 1, wherein the vessel is a vertical vessel and wherein the first wall structure is a cylindrically shaped with an open upper end and an open lower end.

3. The separator of claim 2, wherein the second wall structure is cylindrically shaped with an open upper end and a closed bottom end, the closed bottom end being positioned between the lower end of the first wall structure and the lower end of the vessel.

4. The separator of claim 3, wherein the first wall structure and the second wall structure cooperate to define an annular fluid flow path between the first wall structure and the second wall structure.

5. The separator of claim 2, wherein the liquid outlet conduit extends through the second liquid outlet and into the liquid receiving space of the first wall structure.

6. The separator of claim 1, wherein the vessel is a horizontal vessel and wherein the first wall structure is a first plate extending across the vessel and having an upper end spaced from upper end of the vessel and a lower end spaced from the lower end of the vessel, and wherein the second wall structure is a second plate extending across the vessel and positioned between an inner side of the vessel and an outer side of the first plate with a bottom end of the second plate extending to the lower end of the vessel.

7. The separator of claim 6, wherein the liquid outlet conduit extends through the second liquid outlet and into the liquid receiving space of the first wall structure.

8. The separator of claim 1, wherein the vessel is a horizontal vessel and wherein the first wall structure has a first plate and a second plate, the first plate extending across the vessel and having an upper end spaced from upper end of the vessel and a lower end spaced from the lower end of the vessel, the second plate extending across the vessel and having an upper end spaced from the upper end of the vessel and a lower end extending to the lower end of the vessel, and wherein the second wall structure is a plate extending across the vessel and positioned between an inner side of the vessel and an outer side of the first plate with a bottom end of the second plate extending to the lower end of the vessel.

9. The separator of claim 8, wherein the first liquid outlet is in the lower end of the vessel between the inner side of the vessel and an outer side of the plate of the second wall structure.

10. The separator of claim 9, wherein the second liquid outlet is in the lower end of the vessel between the inner side of the vessel and an outer side of the second plate of the first wall structure.

11. The separator of claim 1, further comprising a pressure-equalizing line in fluid communication with the first automatic drain valve and a space above the upper end of the second wall structure.

12. The separator of claim 10, further comprising a pressure-equalizing line interposed between the second automatic drain valve and a space above the upper end of the second wall structure.

* * * * *